United States Patent Office 2,916,882
Patented Dec. 15, 1959

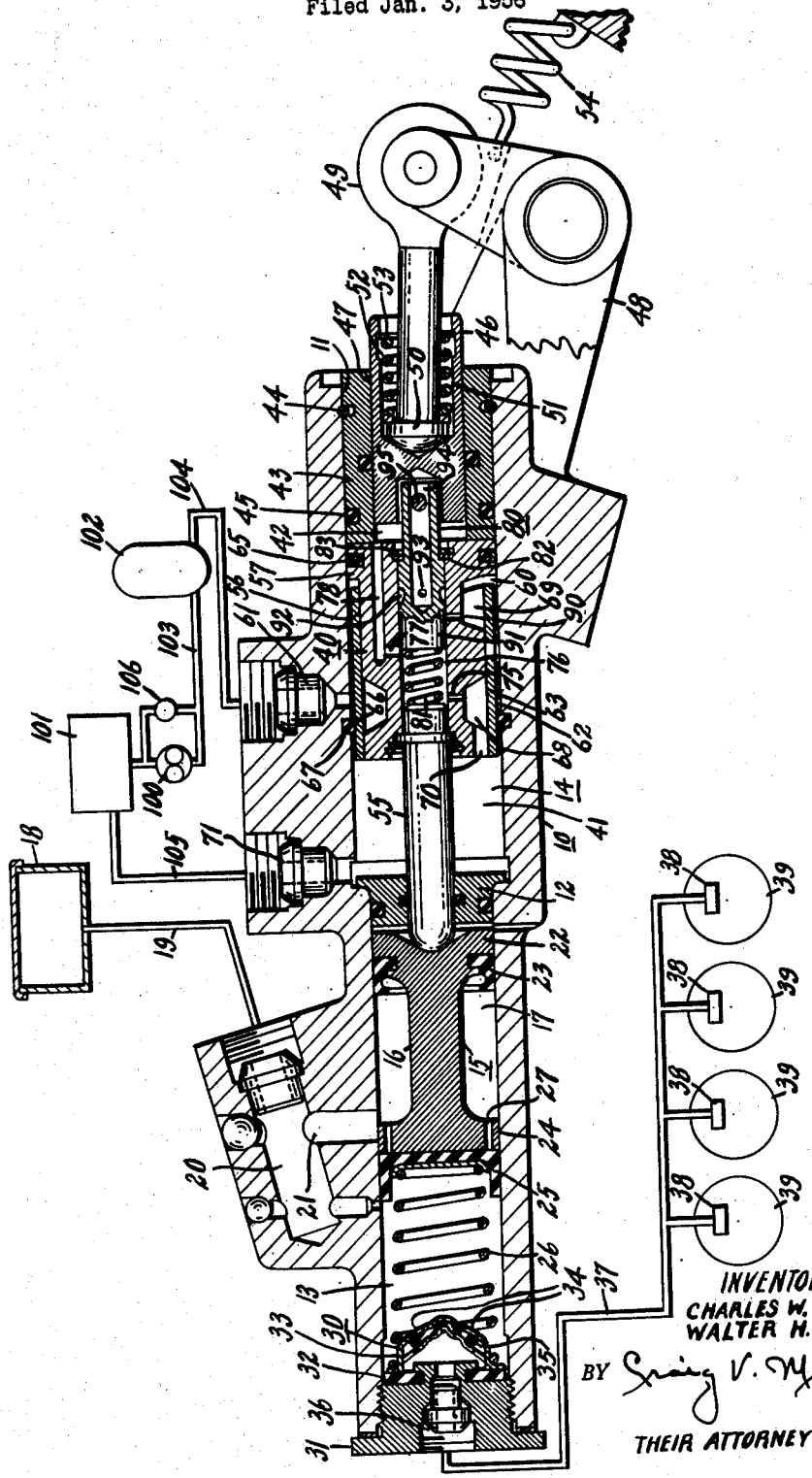
INVENTORS
CHARLES W. SPALDING
WALTER H. WEST
BY [signature]
THEIR ATTORNEY

2,916,882

HYDRAULIC POWER BRAKE BOOSTER

Charles W. Spalding, Saginaw, and Walter H. West, Bay City, Mich., assignors to General Motors Corporation, Detroit, Mich., a corporation of Delaware Application January 3, 1956, Serial No. 556,937

2 Claims. (Cl. 60—54.6)

This invention relates to a hydraulic brake operating mechanism for a hydraulic brake system, and particularly to a hydraulic servo mechanism for actuating the piston of a master cylinder of the brake actuating system.

An object of the invention is to provide a hydraulic servo motor that is manually controlled during its power stroke and is adapted for automatic return of the power piston to its starting point when the manual control is released.

It is another object of the invention to provide a hydraulic servo motor incorporating the feature of the foregoing object wherein the power member of the servo motor is connected with the displacement piston of a hydraulic master cylinder in a manner to effect power movement of the piston during the displacement stroke of the master cylinder piston and to provide for independent return of the power member of the servo motor and of the displacement piston of the master cylinder.

Further objects and advantages of the present invention will be apparent from the following description, reference being had to the accompanying drawings wherein a preferred form of the invention is clearly shown.

In the drawing:

In this invention the hydraulic brake operating mechanism comprises a combined single acting servo motor and master cylinder in which the power member of the servo motor and the displacement piston of the master cylinder are positioned coaxially in a common cylinder housing.

As more particularly disclosed in the drawing the brake operating mechanism comprises a cylinder housing 10 that has a longitudinally disposed cylinder bore 11 extending throughout the length of the cylinder housing 10. The cylinder bore 11 receives a stationary wall 12 positioned substantially midway between opposite ends of the cylinder housing. The stationary wall 12 divides the cylinder bore 11 into a forward cylinder 13 and a rearward cylinder 14. The forward cylinder 13 forms the master cylinder for effecting operation of the brakes of the motor vehicle while the rearward cylinder 14 forms the servo motor for operating the master cylinder piston.

The forward cylinder 13, or master cylinder, contains a displacement piston 15 reciprocable in the cylinder 13. The piston 15 has a reduced diameter center portion 16 whereby to form a chamber 17 between opposite ends of the piston. The chamber 17 is connected with a reservoir 18 by means of a conduit 19 connecting with the passages 20 and 21 in the cylinder housing 10. Passage 21 is in constant communication with the chamber 17 irrespective of the position of the piston 15 in its stroke of reciprocation within the cylinder 13.

The rearward end 22 of the piston 15 is provided with a seal member 23 to prevent leakage of hydraulic fluid from the chamber 17 past the end of the piston.

The forward end 24 of the piston 15 supports a cup seal 25 that is retained against the forward end 24 by means of the compression spring 26, one end of the compression spring engaging the cup seal 25, the opposite end thereof engaging a residual pressure check valve 30 to hold the valve on its seat. The forward end 24 of the piston 15 is also provided with a plurality of passages 27 to provide for flow of hydraulic fluid from the chamber 17 past the outer periphery of the cup seal 25 between the cup seal and the wall of the cylinder 13 when the piston 24 moves through its retraction stroke, to wit, in a rightward direction, thereby replacing any loss of fluid occurring during a previous brake application.

A closure plug 31 is provided in the end of the forward cylinder 13. The closure plug 31 supports a rubberlike valve seat 32 that in turn is engaged by the disk shaped valve member 33 that seats upon the valve seat 32, the valve member 33 being retained on the valve seat 32 by the spring 26. The center portion of the valve member 33 is provided with a plurality of openings 34 that are closed by a rubber-like flapper valve 35. The flapper valve 35 allows fluid to be discharged from the cylinder 13 in a left hand direction, that is for displacement from the cylinder 13 but prevents return of fluid into the cylinder 13. The closure plug 31 is provided with a discharge port 36 that connects by way of a conduit 37 with the wheel cylinders 38 of the hydraulic brakes 39 provided on the wheels of a motor vehicle to effect actuation thereof. The wheel cylinders 38 and the brakes 39 may be of any conventional structure, well known in the art, and hence further description of these structures is not deemed necessary.

During a brake application, fluid is displaced from the cylinder 13 by leftward movement of the master cylinder piston 15 into the brake line 37, the flapper valve 35 permitting fluid to be displaced from the cylinder 13.

When the brakes are released, that is when the master cylinder piston 15 moves in a right hand direction, the pressure of the fluid in the hydraulic line 37 lifts the valve member 33 off its seat 32 for return of the fluid into the cylinder 13. However, when the pressure in the hydraulic line 37 falls to a predetermined value established by the degree of compression of the spring 26, the valve 33 will close upon its seat and retain a residual pressure in the brake lines 37.

The master cylinder piston 15 is operated by a single acting servo motor that comprises a power piston 40 reciprocable in the rearward cylinder 14. The power piston 40 divides the rearward cylinder 14 into two compartments 41 and 42 at opposite ends of the piston. As shown in the drawing, the piston 40 is disposed at one extreme end of its stroke of movement against an annular closure member 43 so that the compartment 42 is at its minimum displacement. The closure member 43 is retained in the extreme right end of the cylinder 14 by means of a spring ring 44, the joint between the member 43 and the wall of the cylinder 14 being pressure sealed by a rubber-like O ring 45.

A manually operated control member 46 slides within a coaxial bore 47 and completes the closure of the right hand end of the cylinder 14. The control member 46 is connected to a bell crank lever 48 by means of a link 49, the bell crank lever being in turn connected with the foot pedal (not shown) normally provided within the passenger compartment of the motor vehicle for actuating the brakes. The link 49 has a head 50 fitting within a recess 51 in the control member 46, a spring 52 retaining the head against the bottom of the recess 51, and being retained within the recess for this purpose by means of a snap ring 53.

A return spring 54 connects the bell crank lever 48 to effect rightward movement of the control member 46 when the foot pedal is released by the operator of the vehicle.

The power piston 40 carries a plunger member 55 that extends through the compartment 41 and through the stationary wall 12 into engagement with the right hand end of the displacement piston 15, the spring 26 retaining the piston 15 against the end of the actuator member 55 but allowing the actuator member to be completely independent of the position of the piston 15 when the actuator moves in a right hand direction.

The power piston 40 has a reduced diameter portion 56 throughout substantially its entire length whereby to provide an annular shoulder 57 at the right hand end of the piston 40, and also thereby providing a chamber 60 that is in permanent connection with the high pressure inlet port 61 by means of an annular chamber 62 disposed around the piston 40 and provided by a clearance space between the outer periphery of a sleeve 63 on the piston 40 and the inner periphery of the wall of the cylinder 14. The annular chamber 62 thereby provides means by which the annular chamber 60 is in continuous or permanent connection with the high pressure fluid inlet port 61 so that the high pressure fluid will be continuously standing against and operated on the shoulder 57 of the piston 40 to urge it in a right hand direction. A seal member 65 is provided between the piston 40 and the cylinder 14 at the right hand end of the piston and is carried within the piston 40. A seal member 66 is positioned in a recess 67 in the wall of the cylinder 14 and engages the outer periphery of the piston 40 near its left hand end when the piston 40 is in its right hand position. The seal 66 allows the piston 40 to reciprocate axially in the cylinder 14 relative to the seal, the two seals 65 and 66 preventing leakage of high pressure fluid from the annular chamber 62.

The piston 40 has two chamber forming recesses 68 and 69. The recess 68 communicates with the forward compartment 41 of the cylinder 14 through a port 70, the compartment 41 having an exhaust port 71 permanently in connection with the compartment. The recess 69 communicates with the annular chamber 60 to receive fluid under pressure from the inlet port 61.

A port 75 connects the exhaust recess 68 with an axial bore 76 provided in the piston 40, a second port 77 connecting the bore 76 with a longitudinally extending passage 78 whereby the chamber 42 at the right hand end of the piston 40 is connected with the compartment 41.

A slide valve 80 is reciprocable in the axial bore 76 and is normally retained in its right hand position by the compression spring 81 against a stop member 82 that is held in position by a snap ring 83, the left hand end of the slide valve 80 normally uncovering the port 77 so that the compartment 42 at the right hand end of the piston 40 is in communication with the exhaust chamber 41 and the exhaust port 71. A port 90 connects the recess 69 with the bore 76 in the piston 40, but is normally closed by the land 91 on the valve element 80.

The valve element 80 has an annular recess 92 that communicates through an opening 93 with a longitudinally extending bore 94 in the valve whereby fluid under pressure can pass from the chamber 60 into the chamber 42 at the right hand end of the valve 40 when the valve element 80 is moved in a left hand direction to align the annular recess 92 with the port 90.

The valve element 80 is connected with the operating member 46 by means of a connecting pin 95.

Hydraulic fluid under pressure for operating the servomotor is produced by the pump 100 that receives fluid from a reservoir 101 and delivers it under pressure to an accumulator 102 by way of a conduit line 103. A conduit 104 connects the accumulator 102 with the inlet port 61 of the servomotor. The exhaust port 71 is connected with the reservoir 101 by means of a conduit 105. A pressure relief valve 106 controls the maximum pressure in the accumulator 102.

In operation, the servomotor and master cylinder are shown in the drawing in the position normally attained with the brakes of the vehicle in a retracted position. High pressure hydraulic fluid stands in the accumulator 102 and thereby in the chambers 62 and 60 and the port 90 of the servomotor, the pressure of the fluid in the chamber 60 acting on the shoulder 57 on the piston 40 to retain the piston in its right end position. The spring 26 in the master cylinder retains the master cylinder piston in its right hand position.

Upon operation of the brake pedal in normal manner for a brake application the bell crank lever 48 is rotated in a counterclockwise direction to effect leftward movement of the operating member 46 and thereby move the valve element 80 in a left hand direction from the position illustrated in the drawing to close the port 77 whereby to cut off communication between the compartments 42 and 41 at opposite ends of the cylinder 40 and align the port 90 with the recess 92 in the valve element whereby fluid under pressure is delivered to the compartment 42 by way of the ports 93 and 94.

Fluid under pressure admitted to the compartment 42 effects power movement of the piston 40 in a leftward direction to cause leftward movement of the displacement piston 15 and thereby displace fluid from the master cylinder into the line 37 and thus the wheel cylinders 38 of the brakes for actuation of the brakes 39. So long as pressure is continued to be applied to the brake pedal tending to advance the valve element 80 in its leftward direction, the brake application will be continued.

However, when the brake application is fully applied and the brake pedal is held stationary, the fluid under pressure being delivered to the compartment 42 at the right hand end of the piston 40 will continue until the power piston 40 is moved in a left hand direction sufficient to align the port 90 with the land 91. However, at this time the exhaust port 77 is also aligned with the land 91 so that the brakes are held in applied condition.

When the brake pedal is released by the operator, the spring 54 will move the operating member 46 in a right hand direction, aided by the spring 81 to move the valve element to the position shown in the drawing whereby the exhaust port 77 is open to allow interconnection between the compartments 42 and 41 for exhaust of fluid from the compartment 42 back to the reservoir 101. At this time the fluid pressure in the inlet port 61 of the servomotor still stands in the chamber 60 and acts on the shoulder 57 of the power piston 40 whereby to cause the power piston to be positively moved in a right hand direction by action of the fluid pressure. This action is independent of the return of the displacement piston 15 in its right hand direction by means of the compression spring 26.

While the form of embodiment of the invention as herein disclosed constitutes a preferred form, it is to be understood that other forms might be adopted as may come within the scope of the claims which follow.

What is claimed is as follows:

1. A hydraulic brake operating mechanism for a hydraulic brake system having a master cylinder, a cooperating master piston, and hydraulic wheel cylinders operating to apply the brakes, comprising a power cylinder adjacent to and concentric with said master cylinder, a power piston reciprocal in said power cylinder dividing said power cylinder into two compartments, one compartment forward and one rearward of said power piston, a push rod extending forward from said power piston to engage said master piston, said power cylinder having a uniform diameter bore from one end of said power piston for the length of travel of said power piston in said bore, a fluid pressure inlet port in said power cylinder, said power piston provided with a hollow cylindrical concentric portion for receiving a sliding valve member provided with passage means therein, passage means within said power piston connecting said passage means in said sliding valve member, said passage means in said power piston and said sliding air valve providing rearward passage means in communication with said inlet port to said rearward compartment rearward of said power piston, said power piston having a minor portion at one end in sliding engagement with the wall of said power cylinder and having a major portion out of engagement with said wall of said power cylinder, an annular seal on the inner periphery of said power cylinder forming a piston guide on a sleeve portion of said power piston, said sleeve portion rigidly mounted on the outer periphery of the forward end of said power piston, said seal cooperating to form a chamber with said sleeve, said power piston and said power cylinder, said chamber in permanent connection with said inlet port with the forward side of said minor portion forming an annular peripheral portion on said power piston biased by a pressurizing fluid in the chamber continuously urging said piston in the rearward direction toward the rearward end of the rearward of said compartments, an exhaust port in permanent connection with said forward compartment, passage means in said power piston interconnecting said chamber with said forward compartment, said sliding valve means in said power piston controlling the opening of said passage means connecting said inlet port with said rearward compartment and closing said passage means connecting said exhaust port with said chamber to provide for pressure delivery of fluid into said rear compartment effecting thereby movement of said power piston against the action of pressure in said chamber to advance said piston into said forward compartment and opening of said passage means connecting said exhaust port to said chamber and closing said passage means connecting said inlet port with said rearward compartment to provide for exhaust of fluid from said rearward compartment into said forward compartment providing thereby for movement of said power piston in said rearward direction as effected by the pressure fluid in said chamber acting on said annular peripheral portion of said power piston.

2. The hydraulic brake operating mechanism for a hydraulic brake system having a master cylinder, a master piston and wheel cylinders to apply the brakes, comprising a power cylinder concentric with and adjacent to said master cylinder, a power piston reciprocal in said power cylinder dividing said power cylinder into a forward and a rearward compartment one on each end of said power piston, said power piston provided with a push rod extending forward into said master cylinder and operatively engaging said master piston to allow for variable return rate of said power piston and said master piston, said power cylinder having a uniform diameter bore from one end of said power piston for the length of travel of said power piston in said bore, a fluid pressure inlet port in said power cylinder, said piston having a minor portion in the rear end in sliding engagement with the wall of said power cylinder and having a major portion out of engagement with said power cylinder, said forward portion of said power piston being out of engagement with said power cylinder and having a sleeve rigidly fixed about the outer periphery and operating as a unit with said power piston, a seal means disposed within the inner-periphery of the power cylinder forming a piston guide on the forward portion of said sleeve on said power piston, said seal cooperating to form a chamber in permanent connection with said inlet port, said chamber formed by said seal, said sleeve, said power piston, and said power cylinder, said chamber in continuous connection with said inlet port having pressurizing fluid biasing the peripheral portion on the rearward end of said power piston of said chamber urging said piston to the rearward end of said rearward compartment, said power piston provided with passage means connecting said chamber to the center portion of said power piston, a sliding valve member having a hollow portion with connecting ports in communication with said passage means in said power piston, said valve member mounted within a hollow concentric portion within said power piston, an exhaust port in permanent connection with the forward compartment of said power cylinder, passage means in said power piston connecting the forward compartment of said power cylinder with said chamber, said sliding valve member adapted for operation by manual means controlling the operation of said power piston to open the passage means from said inlet port and said chamber to the rearward compartment in said power cylinder, and close the passage means connecting said exhaust port with said chamber, thereby providing fluid pressure delivery in said rearward compartment effecting, thereby, movement of said piston against the reaction of pressure fluid in said chamber to advance said piston into said forward compartment, and closing of said passage means connecting said chamber with said rearward compartment and opening of said passage means connecting said chamber with said forward compartment to provide for exhaust of fluid from said forward compartment into said rearward comtpartment, thereby providing for movement of said power piston in the rearward direction as effected by pressure fluid in said chamber acting on said annular peripheral portion of said piston.

References Cited in the file of this patent

UNITED STATES PATENTS

| | | |
|---|---|---|
| 773,365 | Atkins | Oct. 25, 1904 |
| 1,901,772 | Pfau | Mar. 14, 1933 |
| 2,130,799 | Hofstetter | Sept. 20, 1938 |
| 2,241,374 | Alfieri | May 13, 1941 |
| 2,280,190 | Ernst | Apr. 21, 1942 |
| 2,446,149 | Wells | July 27, 1948 |
| 2,752,892 | Banker | July 3, 1956 |
| 2,775,957 | Anderson | Jan. 1, 1957 |

FOREIGN PATENTS

| | | |
|---|---|---|
| 549,300 | Great Britain | Nov. 16, 1942 |